United States Patent
Jang et al.

(10) Patent No.: US 12,401,429 B2
(45) Date of Patent: Aug. 26, 2025

(54) METHODS AND APPARATUS FOR ACOUSTIC BACKSCATTER COMMUNICATION

(71) Applicant: Massachusetts Institute of Technology, Cambridge, MA (US)

(72) Inventors: Junsu Jang, Suwon (KR); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 311 days.

(21) Appl. No.: 17/821,245

(22) Filed: Aug. 22, 2022

(65) Prior Publication Data

US 2023/0008918 A1    Jan. 12, 2023

Related U.S. Application Data

(63) Continuation of application No. 15/931,344, filed on May 13, 2020, now Pat. No. 11,424,839.

(Continued)

(51) Int. Cl.
*H04B 11/00* (2006.01)
*G01H 11/08* (2006.01)
(Continued)

(52) U.S. Cl.
CPC .............. *H04B 11/00* (2013.01); *G01H 11/08* (2013.01); *H04B 13/02* (2013.01); *H04R 1/44* (2013.01); *H04R 17/00* (2013.01)

(58) Field of Classification Search
None
See application file for complete search history.

(56) References Cited

U.S. PATENT DOCUMENTS 5,301,167 A    4/1994  Proakis et al.
7,447,117 B2  11/2008  Yang
(Continued)

OTHER PUBLICATIONS

Afzal, Sayed Saad, et al. "Enabling higher-order modulation for underwater backscatter communication." Global Oceans 2020: Singapore-US Gulf Coast. IEEE, 2020. (Year: 2020).*

(Continued)

*Primary Examiner* — Luke D Ratcliffe
(74) *Attorney, Agent, or Firm* — Daly, Crowley, Mofford & Durkee, LLP (57) ABSTRACT

A communication system may communicate by backscattered acoustic signals that propagate through a liquid or solid. In this system, one or more transmitters may transmit acoustic signals that travel to, and are reflected by, an acoustic backscatter node. The backscatter node may modulate the amplitude and/or phase of the reflected acoustic signals, by varying the acoustic reflectance of a piezoelectric transducer onboard the node. The modulated signals that reflect from the backscatter node may travel to a microphone and may be decoded. The backscatter node may include sensors, and the uplink signals may encode sensor readings. The backscatter node may harvest energy from the downlink acoustic signals, enabling the node and the sensors to be battery-free. Multiple backscatter nodes may communicate concurrently at different acoustic frequencies. To achieve this, each node may have a matching circuit with a different resonant frequency.

16 Claims, 5 Drawing Sheets

Related U.S. Application Data (60) Provisional application No. 62/850,416, filed on May 20, 2019.

(51) Int. Cl.
  H04B 13/02 (2006.01)
  H04R 1/44 (2006.01)
  H04R 17/00 (2006.01)

(56) References Cited

U.S. PATENT DOCUMENTS

| | | | |
|---|---|---|---|
| 8,504,891 | B2 | 8/2013 | Zhou et al. |
| 8,737,435 | B2 | 5/2014 | Jung et al. |
| 9,308,554 | B2 | 4/2016 | Campbell et al. |
| 9,387,514 | B2 | 7/2016 | Mosca et al. |
| 9,503,199 | B2 | 11/2016 | Hiller |
| 9,859,987 | B2 | 1/2018 | Imran |
| 10,284,305 | B2 | 5/2019 | Crowell |
| 2011/0013487 | A1 | 1/2011 | Zhou et al. |
| 2011/0274301 | A1 | 11/2011 | Peck |
| 2011/0317744 | A1 | 12/2011 | Erickson |
| 2013/0208768 | A1 | 8/2013 | Song et al. |
| 2015/0138920 | A1* | 5/2015 | Hiller .............. H04B 11/00 367/87 |
| 2016/0013394 | A1 | 1/2016 | Savioa et al. |
| 2018/0145770 | A1 | 5/2018 | Oelze et al. |
| 2020/0217712 | A1 | 7/2020 | Aftab et al. |

OTHER PUBLICATIONS

Kondapalli et al., Multiaccess In Vivo Biotelemetry Using Sonomicrometry and M-Scan Ultrasound Imaging; published in IEEE Transactions on Biomedical Engineering, vol. 65, No. 1, Jan. 2018.

Sharif-Yazd et al., A Survey on Underwater Acoustic Sensor Networks: Perspectives on Protocol Design for Signaling, MAC and Routing; published in Journal of Computer and Communications, vol. 5, No. 5, Mar. 2017.

Li et al., A Survey on Underwater Acoustic Sensor Network Routing Protocols; published in Sensors 2016, 16(3), 414 (year 2016).

Lu et al., Polarization Reconfigurable Broadband Rectenna With Tunable Matching Network for Microwave Power Transmission; published in IEEE Transactions on Antennas and Propagation, vol. 64, Issue 3, pp. 1136-1141, Mar. 2016.

Fang et al., Feasibility of B-mode Diagnostic Ultrasonic Energy Transfer and Telemetry to a $cm^2$ Sized Deep-Tissue Implant; published in 2015 IEEE International Symposium on Circuits and Systems (2015).

Yang et al., Fifty Years of MIMO Detection: The Road to Large-Scale MIMOs; published in arXiv:1507.05138v1, Jul. 18, 2015.

Seo et al., Neural Dust: An Ultrasonic, Low Power Solution for Chronic Brain-Machine Interface; published in arXiv;1307.219, Jul. 8, 2013.

Li et al., Piezoelectric Materials Used in Underwater Acoustic Transducers; published in Sensors Letters, vol. 10, Nos. 3-4, published in Mar./Apr. 2012, pp. 679-697.

Stojanovic et al., Underwater Acoustic Communication Channels: Propagation Models and Statistical Characterization; published in IEEE Communications Magazine, vol. 47, Issue 1, pp. 84-89, Jan. 2009.

Stojanovic, On the Relationship Between Capacity and Distance in an Underwater Acoustic Communication Channel; published in Mobile Computing and Communications Review, vol. 11, No. 4 (year 2006).

\* cited by examiner

METHODS AND APPARATUS FOR ACOUSTIC BACKSCATTER COMMUNICATION

RELATED APPLICATIONS

This application is a continuation of U.S. Patent of application Ser. No. 15/931,344 filed May 13, 2020, now U.S. Pat. No. 11,424,839 B2 which claims the benefit of provisional application 62/850,416 filed May 20, 2019 with the contents of both applications being incorporated by reference in their entireties as if fully set forth herein.

STATEMENT REGARDING FEDERALLY SPONSORED RESEARCH OR DEVELOPMENT

This invention was made with government support under grant number 029316-00001 awarded by the Office of Naval Research. The U.S. government has certain rights in the invention.

FIELD OF TECHNOLOGY

The present invention relates generally to acoustic backscatter communication.

SUMMARY

In illustrative implementations of this invention, an acoustic backscatter network enables near-zero power communication through a liquid or solid medium.

For instance, a transmitter may transmit acoustic signals comprising sound in the frequency range of 1 Hz to 20 kHz. These acoustic signals may propagate through a liquid or solid medium until they reach a backscatter node. The backscatter node may modulate the amplitude and/or phase of the acoustic signals in such a way that the resulting modulated acoustic signal: (a) encodes data and (b) reflects from the backscatter node. The modulated acoustic signals may travel through the liquid or solid medium to a microphone. The microphone may measure the modulated acoustic signals. A computer may analyze these measurements to decode the data.

In some cases, the acoustic backscatter node harvests energy from the acoustic signals and does not include a battery. In these cases, the power consumption of the backscatter node may be near-zero, because the backscatter node merely reflects (and modulates) acoustic signals, and does not actively generate acoustic signals.

In some cases, the backscatter node includes a piezoelectric transducer. The backscatter node may modulate amplitude and/or phase of acoustic signals that reflect from the piezoelectric transducer. To do so, the backscatter node may control the acoustic reflectance of the transducer, by controlling the electrical impedance of an electrical load that is electrically connected to the transducer. Specifically, decreasing the load impedance (e.g., by shorting the two terminals of the piezoelectric transducer) may tend to stiffen the piezoelectric transducer, thereby reducing the strain (displacement) that the transducer undergoes in response to incident acoustic signals, thereby making the transducer more acoustically reflective. Likewise, increasing the load impedance may tend to make the piezoelectric transducer more flexible, thereby increasing the strain that the piezoelectric transducer undergoes in response to incident acoustic signals, thereby making the transducer less acoustically reflective (or equivalently, more acoustically absorptive).

In some cases, multiple backscatter nodes communicate concurrently over different frequency channels. Multiple acoustic speakers may transmit multiple acoustic signals concurrently, each at a different acoustic frequency. There may be multiple backscatter nodes, each with a different acoustic resonant frequency. The different resonant frequencies of the backscatter nodes may match the respective frequencies at which the speakers are transmitting. Put differently, each backscatter node may be tuned to one of the multiple frequencies. For instance, to tune a backscatter node to a desired acoustic frequency, the backscatter node may include an RLC (resistor-inductor-capacitor) circuit with a resonant frequency that is the same as the desired frequency.

In some cases, the system employs a MAC (medium access control) protocol for concurrent communications by different backscatter nodes over different frequency channels. For instance, an FDMA (frequency-division multiple access) protocol may be employed. A MIMO (multiple-input and multiple-output) decoder may be used to decode the different signals, despite signal collisions.

In some cases: (a) a communication system includes multiple acoustic backscatter nodes; (b) each backscatter node in the system includes one or more sensors; and (c) the backscatter networking enables multiple backscatter nodes to concurrently transmit sensor readings at different acoustic frequencies In some cases, a single backscatter node operates at only a single pre-defined resonant frequency. Alternatively, a backscatter node may be able to change its own resonant frequency. To do so, the backscatter node may include multiple matching circuits, each of which has a different resonant frequency. The backscatter node may tune its own resonant frequency by switching which of these onboard matching circuits is being used.

As noted above, the backscatter node may be battery-free and may harvest energy from incident acoustic signals. The harvested energy may be used to power a microcontroller onboard the backscatter node. In some cases, the harvested energy is also used to power one or more sensors that are electrically connected to the backscatter node. Each backscatter node may include energy-harvesting hardware, including a piezoelectric transducer, multi-stage rectifier, and supercapacitor. When the acoustic reflectance of the piezoelectric transducer is low or zero, the piezoelectric transducer may convert time-varying acoustic signals that are incident on the transducer into time-varying electrical voltage. The multi-stage rectifier may convert this time-varying voltage into DC (direct current) voltage and amplify it. The supercapacitor may then store electrical energy.

Load matching may employed, to ensure efficient harvesting of energy. When the backscatter node is harvesting energy, the output electrical impedance of the piezoelectric transducer onboard the node may be equal to the complex conjugate of the input electrical impedance of an electrical load that is also onboard the node and is electrically attached to the transducer. For instance, this electrical load may include a matching circuit.

In some cases, the acoustic signals are sound that propagates through a liquid medium, such as: (a) ocean water or (b) fresh water of a river or lake. For instance, in a non-limiting use scenario of this invention, a backscatter node powers up by harvesting energy from acoustic signals that are transmitted through 10 meters of ocean water, and then reflects modulated acoustic signals that travel through 10 meters of ocean water to a hydrophone, achieving a data throughput of about 3 kilobytes per second.

Alternatively, in some cases, the acoustic signals are sound that propagates through a solid medium, such as metal, wood, gypsum, drywall, plaster or cement. For instance, the acoustic signals may travel through a metal pipe or a wall, floor or ceiling of a building.

In some cases, the system employs a communication protocol in which the backscatter node is treated as having binary acoustic reflection states: 0 and 1. The 0 and 1 states may correspond to low and high amplitude acoustic signals, respectively, that reflect from the backscatter node. Or, for instance, the 0 and 1 states may correspond to different phases (or different ranges of phases) of acoustic signals that reflect from the backscatter node. In this approach with binary reflection states, each bit of data that is encoded in a modulated acoustic signal (which reflects from the backscatter node) may correspond to a reflection state or to a transition (e.g., rising edge or falling edge of amplitude) between reflection states.

In some cases, the system employs a communication protocol in which the backscatter node is treated as having more than two acoustic reflection states, each of which is determined by amplitude and phase of sound that reflects from the backscatter node. Put differently, each reflection state may be a pair of amplitude and phase, where the amplitude is an amplitude of reflected sound within a specified range of amplitudes and the phase is a phase of reflected sound within a specified range of phases. For instance, in some cases: (a) the system is treated as having four reflection states (each of which is a pair of amplitude and phase); and (b) two bits of data are encoded by a reflection state or by a transition between reflection states. In other cases: (a) the system is treated as having eight reflection states (each of which is a pair of amplitude and phase); and (b) three bits of data are encoded by a reflection state or by a transition between reflection states.

In some cases, the backscatter node modulates amplitude and/or phase of acoustic signals that reflect from the backscatter node. Thus, in some cases, the system may employ an encoding scheme that modulates phase or amplitude of a carrier signal, such as ASK (amplitude-shift keying), QAM (quadrature amplitude modulation) or PSK (phase-shift keying).

This invention has many practical applications. For instance, in some cases, this invention may be employed for near-zero power acoustic communication with underwater sensors that are used for underwater climate change studies, studying marine life, or oil exploration. Or, for instance, this invention may be employed for acoustic communication with remote sensors via acoustic signals that travel through solid materials (e.g. through solid pipes for oil exploration, or through solid walls for military or security purposes). More generally, this invention may be employed to advantage in any long-term deployment of very-low power sensors that communicate their readings over long distances (e.g., meters, tens of meters, hundreds of meters, or kilometers) through a liquid or solid medium.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

Acoustic Backscatter Network

Figure 1:
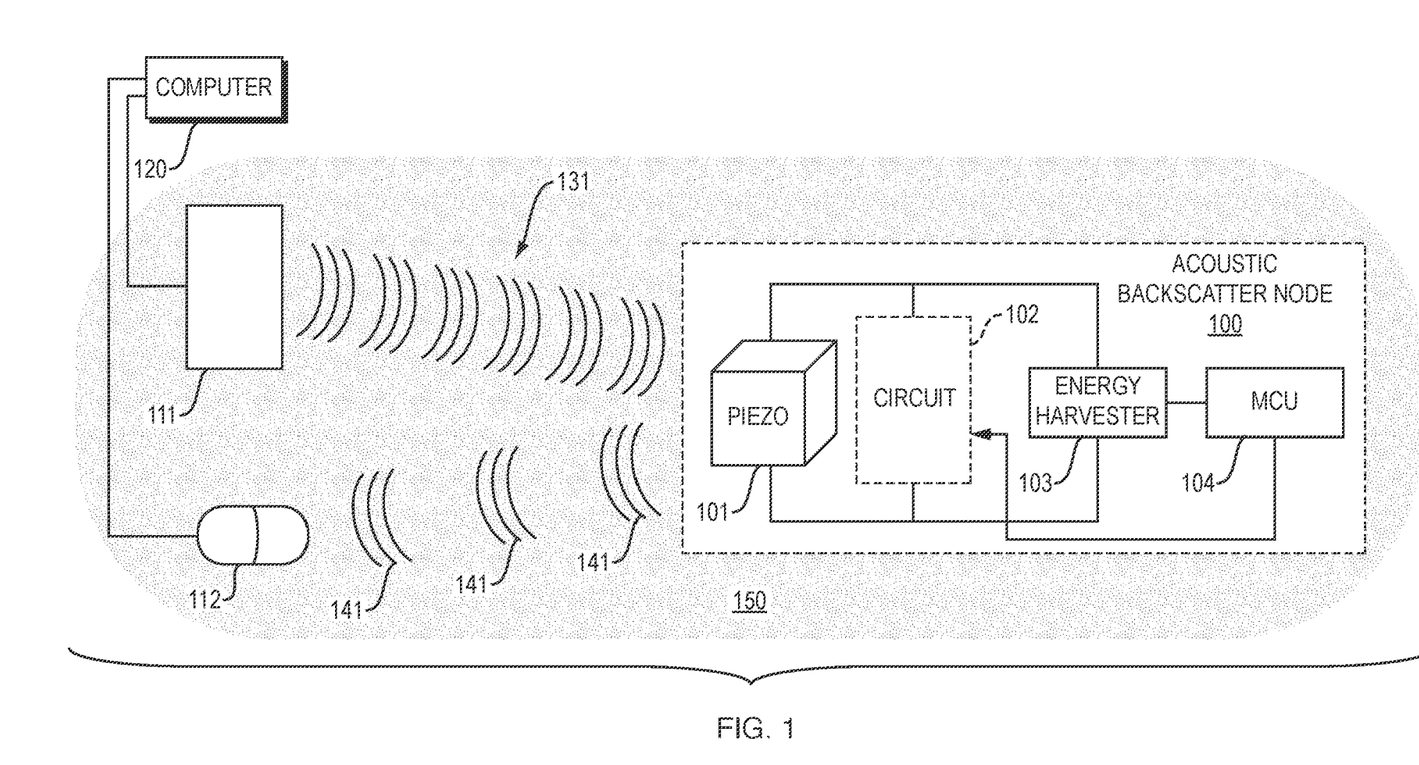
FIG. 1 shows a system for acoustic backscatter communication.

FIG. 1 shows a system for acoustic backscatter communication. In FIG. 1, a set of one or more acoustic transmitters 111 transmits acoustic signals. These acoustic signals 131 are sound waves that propagate through a liquid or solid medium 150, such as ocean water, fresh water, metal, wood, gypsum or cement. The acoustic signals 131 travel to an acoustic backscatter node 100. The backscatter node 100 modulates its acoustic reflectance, in such a way as to modify amplitude and/or phase of the acoustic signals that reflect from the backscatter node. The resulting modulated acoustic signals 141 propagate through the liquid or solid medium 150 to a microphone 112.

In some implementations: (a) the acoustic signals propagate through water; and (b) microphone 112 is a hydrophone. The hydrophone may include a piezoelectric transducer that converts an acoustic signal into an analog electrical signal. More generally, in some cases, microphone 112 is a dynamic microphone (e.g., with a coil of wire suspended in a magnetic field), a condenser microphone (e.g., which employs a vibrating diaphragm as a capacitor plate), or a piezoelectric microphone. The microphone may include a preamplifier.

In some cases, the acoustic transmitters 111 are piezoelectric underwater speakers that transmit acoustic signals through water. The acoustic transmitters may convert an electrical signal into sound.

In some cases, all or part of the communication system is immersed inside, or surrounded by, or in direct physical contact with, the liquid or solid medium. For instance, in some cases, the transmitter(s) 111, backscatter node 100, and a hydrophone (microphone 112) are all immersed in ocean water or fresh water. Or, for instance, transmitter(s) 111, backscatter node 100 and microphone 112 may each be external to, and may touch, a solid medium (such as a pipe or a building wall).

In FIG. 1, the backscatter node includes a piezoelectric transducer 101, matching circuit 102 with a controllable impedance, energy harvester 103, and microcontroller (MCU) 104. The microcontroller 104 may control the electrical impedance of the matching circuit 102, such as by causing one or more transistor switches in the circuit to open or close. By controlling this electrical impedance, the microcontroller may control the acoustic reflectance of the piezoelectric transducer, and thus may control the amplitude and/or phase of acoustic signals that reflect from the piezoelectric transducer.

When the piezoelectric transducer is in an acoustically non-reflective (or low reflective) state, the piezoelectric transducer may absorb energy from the acoustic signals, converting the acoustic signals into a time-varying electrical voltage. The energy harvester 103 may include a multi-stage rectifier that rectifies and amplifies this voltage. The energy harvester 103 may also include a supercapacitor that stores electrical energy.

Computer 120 may control and interface with the transmitter(s) 111 and the microphone 112. In some cases, computer 120 comprises a controller, microcontroller or microprocessor.

Computer 120 may cause the acoustic transmitter(s) 111 to initially transmit a continuous, steady-state acoustic signal. The backscatter node 100 may harvest energy from this signal. Computer 120 may cause the transmitter(s) 111 to send an acoustic query signal to initiate acoustic communication with backscatter node 100. For instance, pulse width modulation (PWM) may encode bits in the query signal, in such a way that different length gaps between acoustic pulses may encode different bits (e.g., 0 and 1). The piezoelectric transducer 101 onboard the backscatter node 100 may convert the acoustic query signal into an electrical signal. This electrical signal, in turn, may be decoded by microcontroller 104 onboard the backscatter node. Once microcontroller 104 has successfully decoded the query signal, microcontroller 104 may cause the backscatter node to modulate acoustic signals that are reflecting from the node, and to thereby send modulated acoustic signals to the microphone 112. These modulated acoustic signals may encode the backscatter node's preamble followed by other data (e.g., data collected from a sensor). In some cases, multiple backscatter nodes are reflecting signals to the microphone concurrently. The preambles of the respective backscatter nodes may be known by computer 120. By correlating, the computer may identify the respective preambles and thus the respective backscatter nodes that are sending signals. The backscattered signal may be encoded using an FM0 scheme, Manchester scheme or other modulation scheme.

In illustrative implementations, the backscatter node includes a piezoelectric transducer. In some cases, the piezoelectric material in this transducer comprises a PZT polycrystalline ceramic. (PZT is a solid solution of PbZrO3 and PbTi O3). Or, for instance, the piezoelectric material may comprise a single crystal, such as PZN-PT single crystal (i.e., a single crystal of a solid solution of lead zinc niobate and lead titanate) or a PMN-PT single crystal (i.e., a single crystal of a solid solution of lead magnesium niobate and lead titanate). Or, for instance, the piezoelectric material may comprise a piezoelectric composite or a piezoelectric polymer.

In some cases, the piezoelectric transducer is air-backed and partially potted. In other words, the piezoelectric material may be encapsulated by a polymer capsule in such a way that air pockets partially surround the piezoelectric material inside the polymer encapsulation. For instance, the polymer capsule may prevent water from entering the transducer. Alternatively, the piezoelectric transducer may be fully potted (i.e., without any air pockets inside the polymer capsule).

The piezoelectric transducer may enable backscatter communication, by modulating sound waves that reflect from the transducer. In some cases, the modulation involves switching between reflective and non-reflective states of the transducer. For instance, the piezoelectric transducer may transmit a "0" bit by absorbing all (or a large portion) of the incoming energy, and may transmit a "1" bit by reflecting all (or a large portion of) the impinging acoustic signal. The transducer may switch between the reflective and absorptive states by modulating the voltage across the piezoelectric interface, which in turn determines its vibration amplitude (i.e., reflection). The microphone may receive the modulated acoustic signals and sense changes in the amplitude due to reflection. A microcontroller may decode these changes to recover the transmitted messages.

The backscatter node may cause the piezoelectric material to operate as a reflector by preventing the piezoelectric material from deforming (i.e., reducing or nulling the strain). Reducing the strain (i.e., reducing deformation of the piezoelectric material) tends to prevent the material from absorbing the incoming acoustic signal and thus tends to cause the material to reflect that signal. To reduce the deformation, the backscatter node may activate a transistor switch to electrically short two terminal electrodes of the piezoelectric transducer. Such switching may require near-zero power and may be done entirely using the harvested energy, enabling the backscatter node to be battery-free.

In some cases, in order to backscatter an incoming acoustic signal, the backscatter node turns on a switch that connects the two terminals of the piezoelectric device. Doing so may ensure that the charge distribution and the electric field are both set to zero in the steady state (since there is no voltage or charge when the terminals are shorted).

The total deformation (strain) of a piezoelectric material may be modeled as:

$$S\ s^E T + dE$$

where S is strain applied on the material, E is an electric field applied on the material, and $s^E$ is the compliance coefficient under constant electric field.

In some cases, when the piezoelectric material is in reflective state, both the electric field and the net tensor are zero. This means that the total strain is nulled (or almost nulled). In other words, the backscatter node may transform the piezoelectric material into a reflector by preventing it from deforming. This may cause the material to reflect all (or a large portion) of the power of an incoming pressure wave.

The preceding discussion focuses on switching between two reflective states to enable backscatter, and on treating the two states as bits of "0" and "1". In practice, backscatter communication may be made more robust by adopting modulation schemes such as FM0 or Manchester encoding, where the reflection state switches at every bit, enabling the receiver to better delineate the bits and robustly decode backscatter signals. Hence, in some cases, the backscatter node employs FM0 modulation for uplink communication (i.e., for communication via modulated acoustic signals that reflect from the backscatter node and travel to the microphone).

The piezoelectric transducer onboard a backscatter node may help harvest energy from a downlink acoustic signal (i.e., from an acoustic signal that is transmitted by an acoustic transmitter and that travels to the node). To do so, the piezoelectric transducer may transform a pressure wave into electrical voltage that is then converted (by a rectifier and supercapacitor) into stored electrical energy.

In illustrative implementations, the absorptive state of backscatter modulation provides an opportunity to harvest energy from the transmitter's downlink acoustic signal since the harvesting involves a conversion between mechanical and electrical energy. The backscatter node may employ the harvested energy to control the backscatter switch. This energy may also be used for powering an onboard microcontroller and for powering various onboard sensors. To ensure maximum power transfer and optimize energy harvesting in the absorptive state, the analog front-end of the backscatter node may employ an impedance matching network. This matching circuit may match the input electrical impedance $Z_L$, of the electrical load to the complex conjugate of the output electrical impedance $Z_s$, of the piezoelectric source. Also, the system may employ a pulse width modulation (PWM) scheme on the downlink. The PWM may be decoded using simple envelope detection, thus minimizing power consumption during backscatter. Also, the PWM may provide ample opportunities for energy harvesting.

As noted above, when the piezoelectric material is in the reflective state, the two terminals of the piezoelectric transducer may be shorted (i.e., $Z_L$=0), causing incident acoustic wave to be entirely (or to a large extent) reflected. Thus, to maximize the SNR, the reflected power in the absorptive state may be minimized. This may achieved by setting $Z_L$,=$Z_s$* .... Notice that this is the same impedance that maximizes the energy transfer as discussed above.

An electrical signal outputted by the piezoelectric transducer may be decoded to read a query or other communication encoded by a downlink acoustic signal In some implementations of this invention, using sound signals in the acoustic frequency range (1 Hz to 20 kHz) is highly advantageous. This is because, for sound, attenuation tends to increase as frequency increases. Ultrasound is typically not practical for transmission of signals over long distances, because the high frequency of ultrasound causes too rapid attenuation of the signal. In some implementations of this invention, the acoustic signals are in an upper portion (e.g., 10 kHz to 20 kHz) of the acoustic range of frequencies.

In some cases, the acoustic backscatter communication system employs a protocol similar to that used for RFIDs. For instance, an acoustic transmitter may transmit a query on the downlink which comprises a preamble, destination address, and payload. Likewise, the uplink backscatter packet may comprise a preamble, a header, and a payload. The uplink payload may include sensor readings from one or more sensors.

In some cases, a single backscatter node operates at only a single pre-defined resonant frequency. Alternatively, a backscatter node may be able to change its own resonant frequency. To do so, the backscatter node may include multiple matching circuits, each of which has a different resonant frequency. The backscatter node may tune its own resonant frequency by switching which of these onboard matching circuits is being used. Alternatively, a backscatter node may tune its own resonant frequency by changing the state of one or more switches in a matching circuit onboard the node.

Each backscatter node may include one or more sensors.

In some cases: (a) a communication system includes multiple acoustic backscatter nodes; (b) each backscatter node in the system includes one or more sensors; and (c) the backscatter networking enables multiple backscatter nodes to concurrently transmit sensor readings at different acoustic frequencies Prototype The following 23 paragraphs describe a prototype of this invention.

In this prototype, the acoustic transducer includes a piezoelectric cylinder with an in-air resonance frequency of 17 kHz, a radius of 2.5 cm, and a length of 4 cm. The cylinder vibrates radially making it omnidirectional in the horizontal plane.

In this prototype, the acoustic transducer is air-backed and end-capped. The piezoelectric resonator is encapsulated with a polymer. End-caps seal off the top and bottom of the cylinder. The encapsulation and end-caps: (a) insulate the electrodes from water (preventing it from shorting the electrodes) and (b) prevent water from flowing inside the cylinder and loading its resonance. This air-backed, end-capped transducer performs highly efficient electromechanical conversion.

Figure 2:
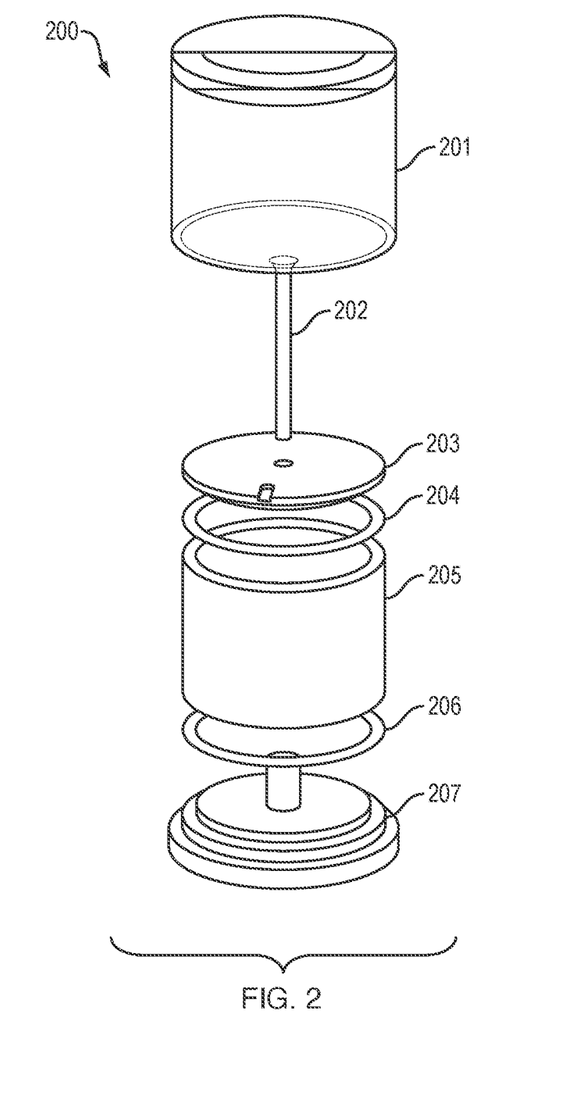
FIG. 2 is an exploded view of a piezoelectric transducer.

FIG. 2 shows an exploded view of a piezoelectric transducer that is used in this prototype. In FIG. 2, the piezoelectric transducer 200 includes a piezoelectric cylinder 205, washers 204, 206, a base 207, an end cap 203, a bolt 202, and a polyurethane encasement 201.

In this prototype, two wires are soldered to the two electrodes of the piezoelectric ceramic (i.e., the inner and outer surfaces of the cylinder). Washers (e.g., 204, 206) enable the cylinder to vibrate freely without being loaded by the end-caps. The setup is held tight using a screw and locking nut, then placed inside the mold.

In this prototype, the transducer is encapsulated in polyurethane, specifically a polyurethane WC-575A mixture. This material is desirable due to its transparency and because its acoustic impedance maximizes the energy transfer between water and the piezoelectric material. The polyurethane encapsulation is fabricated as follows: The components of the polyurethane are mixed and then the resulting mixture is placed inside a vacuum tank to extract any moisture or residual air bubbles from the mixture. Then the prepared polyurethane is poured into a cylindrical mold and left to pot for 12 hours in a pressure chamber at 60 psi (4 atm). Once the potting is done, the mold is removed and marine epoxy is added to seal any remaining holes and ensure that water does not leak into the transducer.

In this prototype, the hardware is entirely battery-free and is fabricated on a two-layer printed circuit board (PCB). The hardware performs: (a) backscatter communication for uplink; (b) energy harvesting; (c) receiving and decoding for downlink signals; and (d) and interfacing with peripherals. Thus, the hardware provides a general-purpose and extensible platform for battery-free underwater sensing and communication.

Figure 3:
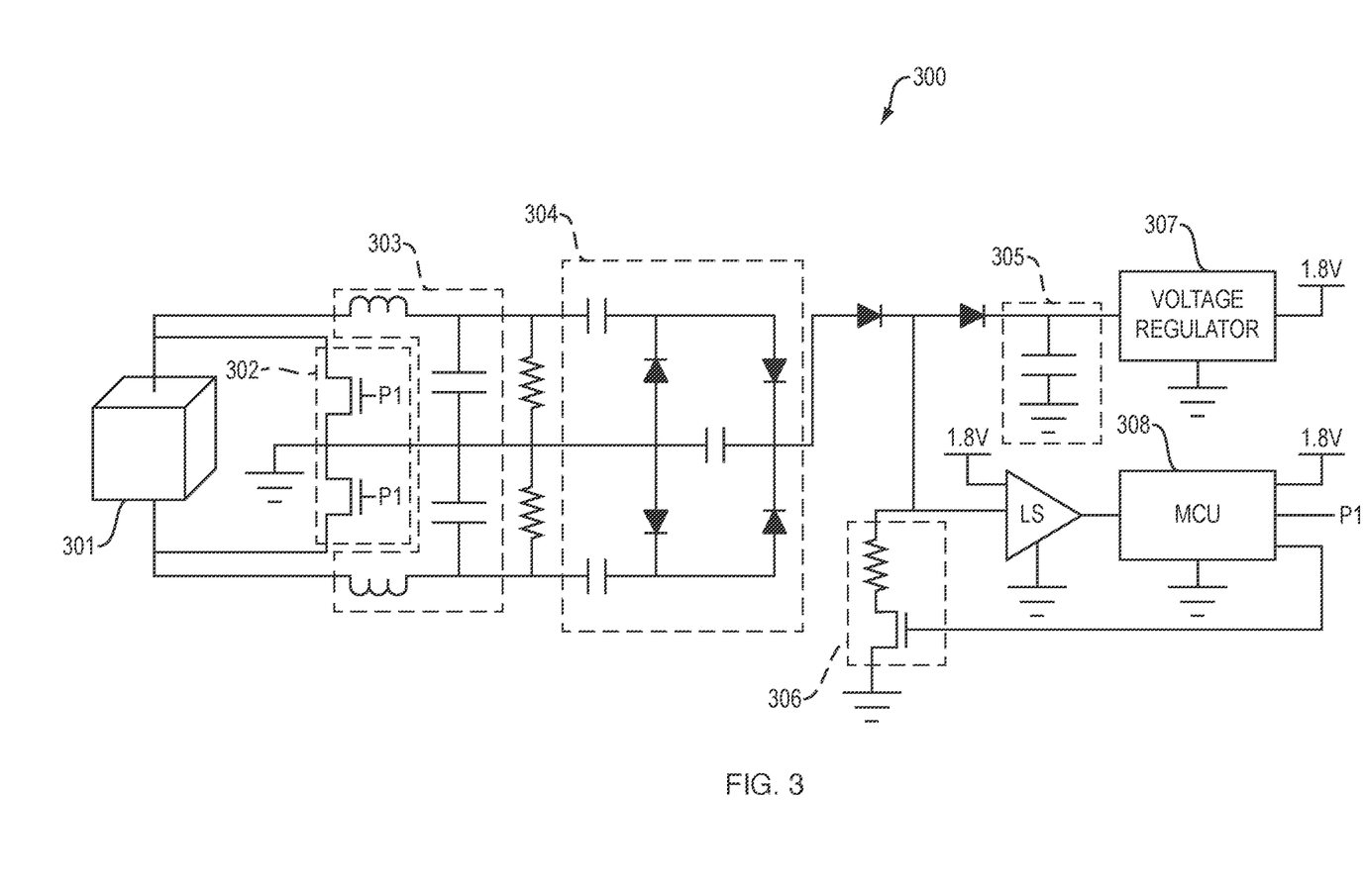
FIG. 3 is a circuit diagram for an acoustic backscatter node that is well-suited for underwater backscatter communication.

In this prototype, an acoustic backscatter node includes the hardware shown in FIG. 3. In FIG. 3, backscatter node 300 includes: (a) a piezoelectric transducer 301; (b) switches 302 that control the load impedance to enable backscatter communication, (c) a matching network 303, (c) a rectifying circuit 304 that converts AC to DC voltage and passively amplifies the voltage, (d) a supercapacitor 305 that stores energy from the rectified DC voltage, (e) a pull-down transistor 306 for improving the SNR (signal-to-noise ratio) of the downlink signals (i.e., the acoustic signals that travel from the acoustic speakers to the backscatter node), a voltage regulator 307, and a microcontroller 308. For instance, switches 302 may comprise transistors.

In this prototype, the backscatter node has a differential analog front-end (including every element shown in FIG. 3, except the microcontroller).

In this prototype, a piezoelectric resonator provides a differential output (rather than a single-ended output with a ground). Hence, the analog front-end adopts a differential design as can be seen in the mirrored architecture in FIG. 3, where the upper and lower portion of the energy harvesting and backscatter units are mirror images of each other.

In this prototype, to enable backscatter communication, two transistors are inserted in series between the two terminals of the piezoelectric device. The middle junction of the two transistors is connected to ground, enabling symmetric backscatter and maximizing the SNR of the backscattered signal. The transistors act as switches to enable toggling the piezoelectric interface between reflective and non-reflective stages, when they are operating in short-circuit and open-circuit modes, respectively. The gates of the transistors are controlled by the microcontroller. The series configuration (in which the two transistors are in series) enables controlling the switches at a lower gate-to-source voltage ($V_G$,) since the source is always at ground. This allows the microcontroller to switch between the two states at a low threshold voltage.

In this prototype, a multi-stage rectifier and a storage capacitor are used for harvesting electrical energy. The multi-stage rectifier transforms the alternating electrical signal coming from the transducer into a DC voltage by passing it through diodes and capacitors. The multi-stage rectifier passively amplifies the voltage to a level sufficient to activate the digital components of the circuit design. The rectified DC charge is stored in a 1000 microFarad super-capacitor.

In this prototype, load-matching is employed to achieve efficient energy harvesting. Specifically, during energy harvesting, the complex conjugate of the output impedance Z., of the piezoelectric transducer may be matched to the input impedance $Z_L$ of the load, that is $Z_L=Z$. An impedance matching network 303 (which includes an inductor and a capacitor) may be inserted between the piezoelectric transducer and the rectifier.

In this prototype, an energy-harvesting supercapacitor is connected to a low-dropout (LDO) voltage regulator, the output of which is 1.8 V. The voltage regulator drives the digital components of the circuit, ensuring they are not damaged or operated in an unsteady state.

In this prototype, the backscatter node employs envelope detection to decode data in the modulated acoustic signals. The downlink communication signal (from acoustic speaker to backscatter node) is encoded using PWM (pulse width modification), where a larger pulse width corresponds to a "1" bit and a shorter pulse width corresponds to a "0" bit. In order to decode these pulses, the backscatter node performs edge detection to identify the bit (pulse) boundaries and durations.

In this prototype, a Schmitt trigger discards small amplitude changes in voltage due to noise and discretizes the output into two main voltage levels: high and low. A level shifter scales the voltage levels to properly condition them as inputs to a microcontroller.

In this prototype, a pull-down transistor improves both the energy harvesting efficiency and the decodability of the downlink signal. Specifically, the pull-down transistor acts as an open-circuit in the cold-start phase (i.e., when the super-capacitor is charging) to ensure that all the incoming energy flows to the capacitor enabling fast charging. Once the capacitor has enough voltage to power on the voltage regulator and the microcontroller (MCU), the MCU applies a voltage on the pull-down transistor changing it to a closed circuit. While this leaks some of the energy to ground, it also maximizes the difference between the high and low voltage levels at the input to the Schmitt trigger, thus improving the SNR for decoding the downlink PWM signal.

In this prototype, an ultra-low power microcontroller reduces power consumption. The microcontroller can operate with a supply voltage as low as 1.8V and consumes less than 230 microamps at 1.8V in active mode and 0.5 microamps in low power mode (LMP3) with just one active clock using a crystal oscillator operating at 32.8 kHz.

In this prototype, the microcontroller powers up. The microcontroller may prepare to receive and decode a downlink command by enabling interrupts and initializing a timer to detect a falling edge at its pin which is connected to the output of the level shifter; then, it enters LMP3 mode. A falling edge at the microcontroller's input may raise an interrupt waking up the microcontroller, which enters active mode to compute the time interval between every edge to decode bit "0" or "1" of the query, before going back to low-power mode.

In this prototype, after the microcontroller successfully decodes downlink signals from the acoustic projector, the microcontroller may prepare for backscatter. The microcontroller: (a) may switch the timer to continuous mode to enable controlling the switch at the backscatter frequency; and (b) may employ FMO encoding. An output pin of the microcontroller is connected to the two switching transistors enabling them to toggle the transducer between reflective and non-reflective states.

In this prototype, the microcontroller may also communicate with analog and digital peripheral sensors. The ADC pin is used for sampling analog sensors and the PC protocol is used to communicate with digital sensors.

In this prototype, each acoustic transmitter (projector) is connected to the output audio jack of a personal computer through a two-channel 750 W power amplifier. The projector is configured to transmit signals at different center frequencies between 12 kHz and 18 kHz. For each different configuration, a different matching circuit may be employed to optimize power transfer between the power amplifier and the transducer. The transmitted signal is generated using MATLAB® software and employs PWM where the "1" bit is twice as long as the "0" bit. The transmitter's downlink query includes a 9-bit preamble. The transmitter packet may also include commands for the PAB backscatter node such as setting backscatter link frequency, switching its resonance mode, or requesting certain sensed data like pH, temperature, or pressure.

In this prototype, the microphone is a hydrophone, whose sensitivity is −180 dB re: 1V/uPa. The hydrophone is connected to the audio jack of a personal computer. An Audacity® software package is used to record the received audio signals. The signals are processed offline using a MATLAB®-based decoder. The decoder identifies the different transmitted frequencies on the downlink using FFT (fast Fourier transform) and peak detection. The decoder then downconverts the signals to baseband by multiplying each of them with its respective carrier frequency. The receiver then employs a Butterworth filter on each of the receive channels to isolate the signal of interest and reduce interference from concurrent transmissions. Subsequently, the decoder performs standard packet detection and carrier frequency offset (CFO) correction using the preamble. The decoder then employs a maximum likelihood decoder to decode the FMO decoded bits. It may also use CRC (cyclic redundancy check) to perform a checksum on the received packets and request retransmissions of corrupted packets. The communication system includes a separate transmitter (projector) and receiver (hydrophone). Hence, the receiver observes a CFO due to the different oscillators.

In this prototype, the microcontroller in the backscatter node may interface with one or more sensors, such as sensors that measure pH, pressure or temperature.

The prototype described in the preceding 23 paragraphs is a non-limiting example of this invention. This invention may be implemented in many other ways.

Reflection States and Encoded Bits

Figure 4A:
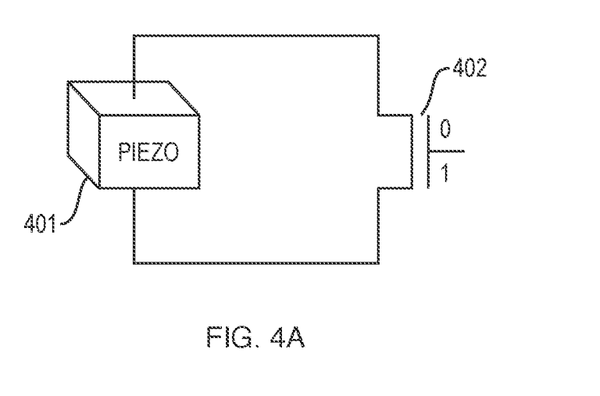
FIGS. 4A and 4B illustrate electrical circuits for encoding one bit of data per acoustic reflection state.
Figure 4B:
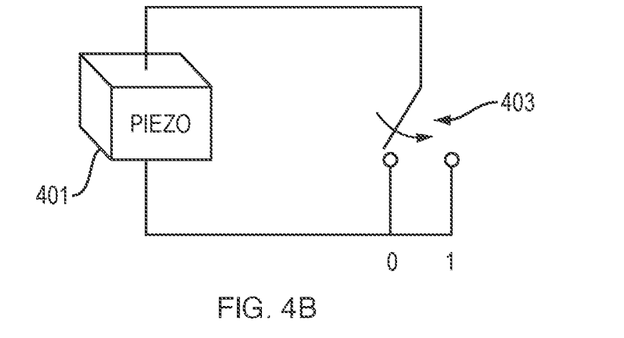

In some implementations of this invention, one bit of data is encoded by a single acoustic reflection state or by a transition between two reflection states. FIGS. 4A and 4B illustrate electrical circuits for encoding one bit of data per acoustic reflection state. In FIGS. 4A and 4B, the electrical impedance of a load—and thus the acoustic reflectance of piezoelectric transducer 401—is controlled by a switch (e.g., transistor switch 402 or switch 403). The two positions of the switch correspond to two different reflection states of the backscatter node (e.g., high reflectance and low reflectance, respectively).

In some implementations, each acoustic reflection state is defined by an ordered pair of amplitude and phase. In this implementations, two or more bits of data are encoded by a single acoustic reflection state or by a transition between two reflection states. Each of the different reflection states may be an ordered pair of amplitude and phase of modulated light that reflects from the backscatter node.

Figure 5:
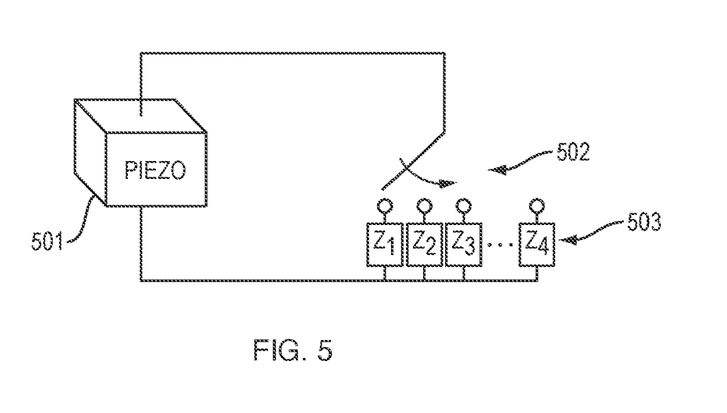
FIG. 5 illustrates an electrical circuit for encoding two or more bits of data per acoustic reflection state.

FIG. 5 shows an electrical circuit for encoding two or more bits of data per acoustic reflection state. In FIG. 5, the acoustic reflectance of piezoelectric transducer 501 is controlled by changing electrical impedance of an electrical load. In the example shown in FIG. 5, the electrical impedance is controlled by a switch 502 which selects one of a set of electrical paths 503 that each have a different electrical impedance. These different electrical impedances may be created by a combination of one or more resistors, inductors and capacitors. In FIG. 5, each of the different electrical impedances ($Z_1$, $Z_2$, $Z_3$, . . . $Z_N$) correspond to a different ordered pair of amplitude and phase of electrical impedance. In actual practice, an equivalent circuit may be employed, instead of the circuit shown in FIG. 5.

In FIG. 5, if N=4, then: (a) the electrical load may be switched to any of four different electrical impedances, each of which corresponds to a different ordered pair of amplitude and phase; (b) the backscatter node may have any of four different reflection states; and (b) two bits are encoded by a single reflection state or by a single transition between reflection states.

In FIG. 5, if N=8, then: (a) the electrical load may be switched to any of eight different electrical impedances, each of which corresponds to a different ordered pair of amplitude and phase; (b) the backscatter node may have any of eight different reflection states; and (b) three bits are encoded by a single reflection state or by a single transition between reflection states.

Concurrent Backscatter Signals

In some implementations, multiple backscatter nodes send acoustic signals concurrently, each at a different center frequency, thereby enabling higher data throughput.

In this approach, each of the backscatter nodes has a different acoustic resonant frequency and reflects modulated acoustic signals at a center frequency that corresponds to this resonant frequency. The resonant frequency of a backscatter node may be tuned by a circuit (e.g., an RLC circuit) onboard the backscatter node.

In this approach, the acoustic signals may be sent in accordance with a MAC (medium access control) protocol that enables decoding of network collisions. In some cases, an FDMA (frequency-division multiple access) protocol is employed. For instance, in some cases: (a) each backscatter node has a slightly different resonance frequency; and (b) the different backscatter nodes occupy different bands of the acoustic frequency spectrum, thereby facilitating FDMA. In some cases: (a) different acoustic projectors transmit acoustic signals at different frequencies; and (b) each acoustic projector activates a different backscatter node operating at the corresponding resonance frequency, thus facilitating concurrent multiple access. The microphone (e.g., a hydrophone) may receive all the reflected signals and apply software-based filters in order to isolate and decode the colliding backscatter reflections. The receiving microphone (e.g., hydrophone) may employ a MIMO (multiple-input and multiple-output) decoder to deal with collisions.

In some cases, more than one microphone is employed to measure the backscattered modulated signals. For instance, different microphones may be employed to measure different frequency channels.

In some cases, concurrent communication at different acoustic frequencies is used to report readings from multiple sensors. For instance: (a) multiple backscatter nodes may have a different acoustic resonant frequency; and (b) each backscatter node may reflect modulated acoustic signals that encode data recorded by one or more sensors.

In some cases, each backscatter node includes (or is housed together with and electrically connected to) one or more sensors.

In some cases, acoustic signals with different center frequencies are employed, but the acoustic signals may still overlap to some extent and signal collisions may still occur. To extract the different signals from the measurements taken by the microphone(s), one or more computers may perform a MIMO decoder algorithm. For instance, the MIMO decoder algorithm may be: (a) a linear MIMO decoder, such as a matched filter (MF) detector, linear zero-forcing (ZF) detector, linear minimum mean-square error (MMSE) detector, linear maximum asymptotic-multiuser-efficiency (MAME) detector, linear weighted least-squares (WLS) detector, linear minimum bit error rate (MBER) detector; (b) an interference-cancellation MIMO detector, such as a successive interference cancellation (SIC) detector, parallel interference cancellation (PIC) detector, multistage interference cancellation (MIC) detector, or decision-feedback detector (DFD), (c) a tree-search MIMO detector, such as the sphere decoder (SD), (d) lattice-reduction (LR) MIMO detector, (e) a probabilistic data association (PDA) MIMO detector, or (f) a semidefinite programming relaxation (SDPR) MIMO detector.

In some implementations, backscatter modulation is frequency-agnostic. Specifically, as long as an acoustic backscatter node powers up (due to a downlink signal within its resonance bandwidth), the node may backscatter and modulate the reflections of all acoustic signals impinging on it, even those outside its resonance frequency. (The modulation depth of backscattered signals—i.e., difference between reflected and absorbed power—may decrease as their frequency moves away from resonance due to the degradation in impedance matching and efficiency). Thus, in some cases, even if a backscatter node is turned to a first acoustic resonant frequency, the node may also backscatter signals at a second acoustic frequency, thus interfering with a concurrent transmission at the second frequency.

To overcome this challenge, MIMO decoding may be employed. For instance, if two different acoustic backscatter nodes are tuned to two different resonant frequencies, then a microphone receiver may measure the following two signals:

$$= h_i(f_i)x_i + Iz_i(1)x,$$
$$y(f_2) = 4(f_2)x_i + hjf_i)x,$$

where y is the received signal, $f_1$ and $f_2$ are the resonance frequencies, x, and $x_2$ are the backscattered signals reflected from the two different nodes, and $h_1$ and $h_2$ are their corresponding frequency-selective channels.

In the example described in the preceding paragraph, a computer may perform channel estimation, and then may invert the channel matrix and decode the two signals using MIMO decoding. More generally, if N acoustic backscatter nodes with N resonant frequencies reflect acoustic signals, then channel estimation may be performed, and an N×N channel matrix may be inverted to decode the signals using a MIMO decoder algorithm.

Figure 6:
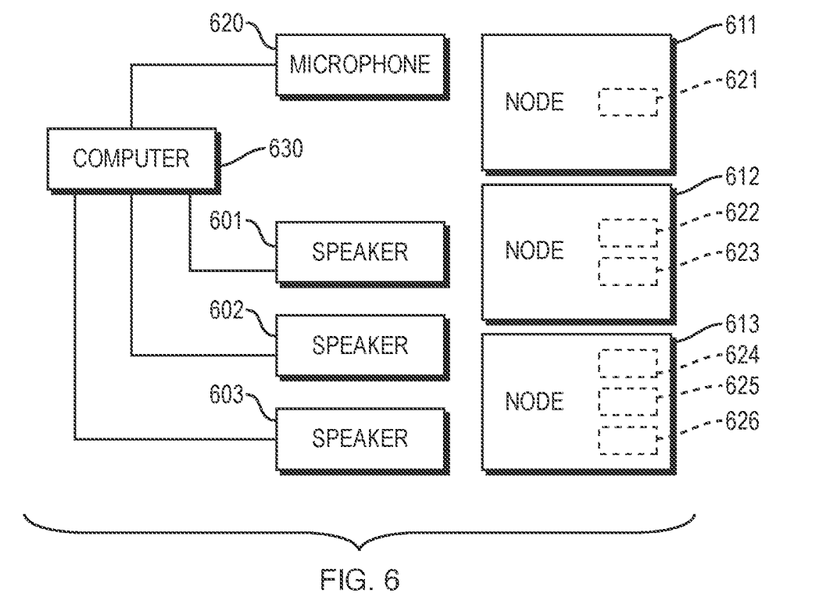
FIG. 6 illustrates a system in which acoustic backscatter is employed to communicate concurrently over different frequency channels.

FIG. 6 illustrates a system in which acoustic backscatter is employed to communicate concurrently over different frequency channels. In FIG. 6, speakers 601, 602, and 603 transmit acoustic signals at different center frequencies. Backscatter nodes 611, 612, and 613 have different resonant frequencies that are equal to the respective center frequencies at which the speakers are transmitting. These different resonant frequencies are due to different tuning circuits onboard the backscatter nodes. Likewise, the modulated acoustic signals that reflect from backscatter nodes 611, 612, and 613 have the same center frequencies as the center frequencies at which the respective transmitters are transmitting.

In FIG. 6, each backscatter node includes one or more sensors. Specifically: (a) backscatter node 611 includes sensor 621; (b) backscatter node 612 includes sensors 622 and 623; and (c) backscatter node 613 includes sensors 624, 625 and 626. A wide variety of low-power sensors (e.g., pH, pressure, temperature and salinity sensors) may be employed. In FIG. 6, the modulated acoustic signals that reflect from each backscatter node may (during certain time periods) encode sensor readings taken by the one or more sensors that are included in that node. A single microphone (e.g., hydrophone) 620 may record the modulated acoustic signals from the different backscatter nodes. A computer 630 may control and interface with the transmitters and microphone, and may decode data that is encoded in the modulated acoustic signals. For instance, computer 630 may decode the sensor readings taken by the sensors in the backscatter nodes.

Near-Audio Ultrasonic Backscatter Communication

The discussion above focuses on backscatter communication in the acoustic range of frequencies (1 Hz to 20 kHz). However, this invention is not limited to acoustic signals.

For instance, in some alternate implementations of this invention, backscatter communication occurs in what we call the "near-audio ultrasonic" range of frequencies (greater than 20 kHz and less than or equal to 100 kHz). To describe these alternate implementations, each reference herein to "acoustic" may be replaced by "near-audio ultrasonic" (for instance, each time that the phrase "acoustic signal" occurs herein, it may be replaced by "near-audio ultrasonic signal").

Computers

In illustrative implementations of this invention, a communication system includes computers (e.g. 104, 120, 308, 630). These computers (e.g., servers, network hosts, client computers, integrated circuits, microcontrollers, controllers, microprocessors, field-programmable-gate arrays, personal computers, digital computers, driver circuits, or analog computers) may be programmed or specially adapted to perform one or more of the following tasks: (1) to control the operation of, or interface with, hardware components of an acoustic backscatter communication network, including any speakers, microphones, backscatter nodes, switches, and sensors; (2) to encode or decode uplink messages; (3) to encode or decode downlink messages; (4) to control modulation of acoustic signals that reflect from a backscatter node; (5) to receive data from, control, or interface with one or more sensors; (6) to perform any other calculation, computation, program, algorithm, or computer function described or implied herein; (7) to receive signals indicative of human input; (8) to output signals for controlling transducers for outputting information in human perceivable format; (9) to process data, to perform computations, and to execute any algorithm or software; and (10) to control the read or write of data to and from memory devices (tasks 1-10 of this sentence being referred to herein as the "Computer Tasks").

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"AC" means alternating current.

As used herein, "acoustic backscatter node" means a device that is configured to reflect one or more acoustic signals. A human is not an "acoustic backscatter node", as that term is used herein.

As used herein, "acoustic microphone" means a microphone that is configured to measure one or more acoustic signals.

As used herein, "acoustic power" means power of an acoustic signal.

As used herein, "acoustic reflectance" of an object is the fraction of acoustic power reflected from the object. Thus, acoustic reflectance is a measure of the effectiveness of the object in reflecting acoustic signals.

As used herein, "acoustic signal" means a signal that comprises sound and that has a peak frequency greater than or equal to 1 Hertz and less than or equal to 20,000 Hertz.

As used herein, "acoustic resonant frequency" means a resonant frequency that is greater than or equal to 1 Hertz and less than or equal to 20,000 Hertz.

As used herein, "acoustic transmitter" means a transmitter that is configured to transmit one or more acoustic signals. A human is not an "acoustic transmitter", as that term is used herein.

To compute "based on" specified data means to perform a computation that takes the specified data as an input.

The term "comprise" (and grammatical variations thereof) shall be construed as if followed by "without limitation". If A comprises B, then A includes B and may include other things Each of the following is a non-limiting example of a "computer", as that term is used herein: (a) a digital computer; (b) an analog computer; (c) a computer that performs both analog and digital computations; (d) a microcontroller; (e) a microprocessor; (f) a controller; (g) a tablet computer; (h) a notebook computer; (i) a laptop computer, (j) a personal computer; (k) a mainframe computer; and (l) a quantum computer. However, a human is not a "computer", as that term is used herein.

"Computer Tasks" is defined above.

"DC" means direct current.

"Defined Term" means a term or phrase that is set forth in quotation marks in this Definitions section.

As used herein, "downlink" acoustic signal means an acoustic signal that travels from an acoustic transmitter to an acoustic backscatter node.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

As used herein, "near-audio ultrasonic backscatter node" means a device that is configured to reflect one or more near-audio ultrasonic signals. A human is not a "near-audio ultrasonic backscatter node", as that term is used herein.

As used herein, "near-audio ultrasonic microphone" means a microphone that is configured to measure one or more near-audio ultrasonic signals.

As used herein, "near-audio ultrasonic power" means power of a near-audio ultrasonic signal.

As used herein, "near-audio ultrasonic reflectance" of an object is the fraction of near-audio ultrasonic power reflected from the object. Thus, near-audio ultrasonic reflectance is a measure of the effectiveness of the object in reflecting near-audio ultrasonic signals.

As used herein, "near-audio ultrasonic signal" means a signal that comprises sound and that has a peak frequency greater than 20,000 Hertz and less than or equal to 100,000 Hertz.

As used herein, "near-audio ultrasonic resonant frequency" means a resonant frequency that is greater than 20,000 Hertz and less than or equal to 100,000 Hertz.

As used herein, "near-audio ultrasonic transmitter" means a transmitter that is configured to transmit one or more near-audio ultrasonic signals. A human is not a "near-audio ultrasonic transmitter", as that term is used herein.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

As used herein, the term "set" does not include a group with no elements.

"SNR" means signal-to-noise ratio.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

As used herein, "uplink" acoustic signal means an acoustic signal that travels from an acoustic backscatter node to an acoustic microphone.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a system comprising: (a) one or more acoustic transmitters; (b) a set of one or more acoustic backscatter nodes; and (c) one or more acoustic microphones; wherein (i) the one or more acoustic transmitters are configured to transmit downlink acoustic signals that travel to the set, (ii) each particular acoustic backscatter node in the set is configured to perform modulation, in such a way as to modulate amplitude and/or phase of sound that reflects from the particular node, thereby producing modulated uplink acoustic signals that encode data and that travel from the particular node to the one or more acoustic microphones, and (iii) at least one of the one or more acoustic microphones is configured to take measurements of the modulated uplink acoustic signals. In some cases, each particular acoustic backscatter node in the set: (a) includes a piezoelectric transducer and a circuit; and (b) is configured to change electrical impedance of the circuit and to thereby change acoustic reflectance of the piezoelectric transducer. In some cases: (a) the downlink acoustic signals include a set of acoustic signals, each at a different center frequency; and (b) the one or more transmitters are configured to transmit the set of acoustic signals at the different center frequencies concurrently. In some cases, at least one acoustic backscatter node in the set includes one or more sensors. In some cases, each acoustic backscatter node in the set: (a) includes a piezoelectric transducer; (b) also includes multiple circuits that each have a different resonant frequency; and (c) is configured to switch which of the matching circuits forms an electrical loop with the piezoelectric transducer. In some cases: (a) the set of nodes includes multiple acoustic backscatter nodes; and (b) the multiple acoustic backscatter nodes are configured to perform the modulation in accordance with a medium access control protocol. In some cases: (a) the downlink acoustic signals include a group of acoustic signals, each at a different center frequency; (b) the one or more transmitters are configured to transmit the group of acoustic signals at the different center frequencies; (c) the set of nodes includes multiple acoustic backscatter nodes; and (d) the multiple acoustic backscatter nodes are configured to perform the modulation in accordance with a frequency-division multiple access protocol. In some cases, each acoustic backscatter node in the set includes hardware that is configured to harvest electrical energy from the downlink acoustic signals, which hardware includes: (a) a piezoelectric transducer that is configured to convert pressure waves into an electrical signal, which pressure waves occur in the transducer and are induced by the downlink acoustic signals; (b) a rectifier that is configured to convert the electrical signal into direct current voltage; and (c) one or more capacitors that are configured to store electrical energy. In some cases, each acoustic backscatter node in the set includes a piezoelectric transducer and a circuit that has an input electrical impedance, which input impedance matches the complex conjugate of an output electrical impedance of the piezoelectric transducer. In some cases, each bit of data that is encoded by the modulated uplink acoustic signals corresponds to a reflection state, or to a transition between two reflection states, of an acoustic backscatter node in the set. In some cases, each acoustic backscatter node in the set: (a) includes a piezoelectric transducer; and (b) is configured to perform the modulation in such a way that (i) the piezoelectric transducer undergoes different reflection states at different times during the modulation, which reflection states are members of a group of reflection states that are each determined by amplitude and phase of the complex conjugate of an input electrical impedance of an electrical load that is electrically connected to the piezoelectric transducer, and (iii) two or more bits of the data are encoded by a reflection state in the group, or by a transition between reflection states in the group. In some cases: (a) the set of nodes includes multiple acoustic backscatter nodes; (b) each of the multiple acoustic backscatter nodes has a different resonant frequency; and (c) the system includes one or more computers that are programmed to perform a multiple-input and multiple-output algorithm. Each of the cases described above in this paragraph is an example of the system described in the first sentence of this paragraph, and is also an example of an embodiment of this invention that may be combined with other embodiments of this invention.

In some implementations, this invention is a system comprising: (a) one or more acoustic transmitters; (b) a set of one or more acoustic backscatter nodes; and (c) one or more acoustic microphones; wherein (i) the one or more acoustic transmitters are configured to transmit downlink acoustic signals that travel through a liquid medium to the set, (ii) each particular acoustic backscatter node in the set (A) includes a piezoelectric transducer, and (B) is configured to perform modulation, in such a way as to modulate amplitude and/or phase of sound that reflects from the particular node, thereby producing modulated uplink acoustic signals that encode data and that travel through the liquid medium from the particular node to the one or more acoustic microphones, and (iii) at least one of the one or more acoustic microphones is configured to take measurements of the modulated uplink acoustic signals. In some cases, the liquid medium is ocean water. In some cases: (a) the downlink acoustic signals include a set of acoustic signals, each at a different center frequency; and (b) the one or more transmitters are configured to transmit the set of acoustic signals at the different center frequencies concurrently. In some cases, the set of nodes includes multiple acoustic backscatter nodes that each: (a) include one or more switches; (b) have an acoustic resonant frequency; and (c) are configured to modify the acoustic resonant frequency by changing a state of one or more of the switches. Each of the cases described above in this paragraph is an example of the system described in the first sentence of this paragraph, and is also an example of an embodiment of this invention that may be combined with other embodiments of this invention.

In some implementations, this invention is a system comprising: (a) one or more acoustic transmitters; (b) a set of one or more acoustic backscatter nodes; and (c) one or more acoustic microphones; wherein (i) the one or more acoustic transmitters are configured to transmit downlink acoustic signals that travel through a solid medium to the set, (ii) each particular acoustic backscatter node in the set (A) includes a piezoelectric transducer, and (B) is configured to perform modulation, in such a way as to modulate amplitude and/or phase of sound that reflects from the particular node, thereby producing modulated uplink acoustic signals that encode data and that travel through the solid medium from the particular node to the one or more acoustic microphones, and (iii) at least one of the one or more acoustic microphones is configured to take measurements of the modulated uplink acoustic signals. In some cases, the solid material includes metal. In some cases, the solid material includes wood. In some cases, the set of nodes includes multiple acoustic backscatter nodes that each: (a) include one or more switches; (b) have an acoustic resonant frequency; and (c) are configured to modify the acoustic resonant frequency by changing a state of one or more of the switches. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. An acoustic backscatter node comprising:
   means for receiving an acoustic signal;
   means for modulating one or more of an amplitude, frequency and phase of sound that reflects from the acoustic backscatter node to produce modulated uplink acoustic signals that encode data;
   one or more switches; and
   a circuit having an acoustic resonant frequency and configured to modify the acoustic resonant frequency of the circuit by changing a state of one or more of the one or more switches.

2. The acoustic backscatter node of claim 1 further comprising means for enabling the acoustic backscatter node to operate in a liquid medium.

3. The acoustic backscatter node of claim 1 wherein the modulated uplink acoustic signals are configured to travel from the acoustic backscatter node to one or more acoustic microphones.

4. The acoustic backscatter node of claim 1 further comprising:
   a piezoelectric transducer having an acoustic reflectance characteristic;
   a circuit coupled to the piezoelectric transducer; and
   means for changing an electrical impedance of the circuit to thereby change the acoustic reflectance characteristic of the piezoelectric transducer.

5. The acoustic backscatter node of claim 1 further comprising:
   a piezoelectric transducer responsive to modulation of an acoustic signal and configured to undergo one or more different reflection states at different times during the modulation and wherein the one or more different reflection states are members of a group of reflection states that are each determined by amplitude and phase of a complex conjugate of an input electrical impedance of an electrical load that is electrically connected to the piezoelectric transducer and wherein two or more bits of the data are encoded by a reflection state in the group, or by a transition between reflection states in the group.

6. The acoustic backscatter node of claim 1 further comprising one or more sensors.

7. The acoustic backscatter node of claim 3 further comprising:
   (a) a piezoelectric transducer;
   (b) a plurality of matching circuits, each having a different resonant frequency; and
   (c) means for selecting which of the matching circuits forms an electrical loop with the piezoelectric transducer.

8. The backscatter node of claim 1, further comprising energy-harvesting hardware configured to harvest energy from incident acoustic signals.

9. The backscatter node of claim 8, wherein the energy-harvesting hardware comprises:
- a piezoelectric transducer;
- a multi-stage rectifier; and
- a supercapacitor.

10. An acoustic backscatter node comprising:
- means for receiving an acoustic signal;
- means for modulating one or more of an amplitude, frequency and phase of sound that reflects from the acoustic backscatter node to produce modulated uplink acoustic signals that encode data;
- a piezoelectric transducer having an acoustic reflectance characteristic;
- a circuit coupled to the piezoelectric transducer; and
- means for changing an electrical impedance of the circuit to thereby change the acoustic reflectance characteristic of the piezoelectric transducer,
- wherein an input of the circuit is coupled to an output of the piezoelectric transducer and the circuit has an input electrical impedance which matches a complex conjugate of an output electrical impedance of the piezoelectric transducer.

11. A backscatter node configured for operation in a liquid medium, the backscatter node comprising:
- a piezoelectric transducer having an acoustic reflectance characteristic, the piezoelectric transducer configured such that the backscatter node modulates one or more of a frequency, amplitude and phase of acoustic signals that reflect from the piezoelectric transducer to produce modulated uplink acoustic signals that encode data and that travel through the liquid medium;
- means for controlling an acoustic reflectance of the piezoelectric transducer by controlling an electrical impedance of an electrical load electrically coupled to the piezoelectric transducer;
- means for receiving a command in a transmitter packet, the command includes instructions for the backscatter node to switch to a resonant mode;
- multiple matching circuits, each of which has a different resonant frequency; and
- means for selecting at least one of the multiple matching circuits wherein the backscatter node tunes a resonant frequency of the backscatter node in accordance with the resonant mode by selecting one or more of the multiple matching circuits to be used.

12. The backscatter node of claim 11 wherein:
a. in response to decreasing an impedance of a load, the piezoelectric transducer stiffens, thereby reducing strain the piezoelectric transducer undergoes in response to incident acoustic signals, thereby making the transducer more acoustically reflective; and
b. in response to increasing the load impedance of a load, the piezoelectric transducer becomes more flexible, thereby increasing strain the piezoelectric transducer undergoes in response to incident acoustic signals, thereby making the transducer less acoustically reflective.

13. The backscatter node of claim 11 configured to operate at only a single pre-defined resonant frequency.

14. The backscatter node of claim 11 wherein the backscatter node is battery-free and harvests energy from incident acoustic signals.

15. The backscatter node of claim 14 further comprises at least one of:
- a microcontroller and harvested energy is used to power the microcontroller; and
- one or more sensors wherein harvested energy is used to power at least one of the one or more sensors.

16. The backscatter node of claim 11 further comprising:
a. a multi-stage rectifier; and
b. a supercapacitor and wherein the piezoelectric transducer, multi-stage rectifier, and supercapacitor are configured to harvest energy.

* * * * *